United States Patent [19]

Jenkner et al.

[11] Patent Number: 6,096,394
[45] Date of Patent: Aug. 1, 2000

[54] PROCESS FOR MANUFACTURING SURFACE-SEALED HOLLOW GLASS CONTAINERS

[75] Inventors: Peter Jenkner, Rheinfelden; Rainer Lomölder, Münster; Peter Speier, Marl; Elmar Stäbler, Bad Wurzach; Alois Fickler, Pfaffenhausen; Gerd Buchmayer, Bad Wurzach, all of Germany

[73] Assignees: Sivento Chemie Rheinfelden GmbH, Rheinfelden; Oberland Glas AG, Bad Wurzach, both of Germany

[21] Appl. No.: 09/147,337

[22] PCT Filed: Mar. 28, 1998

[86] PCT No.: PCT/EP98/01838

§ 371 Date: Mar. 19, 1999

§ 102(e) Date: Mar. 19, 1999

[87] PCT Pub. No.: WO98/45217

PCT Pub. Date: Oct. 15, 1998

[30] Foreign Application Priority Data

Mar. 4, 1998 [DE] Germany .............. 198 09 033

[51] Int. Cl.[7] .............. B05D 3/02; B05D 3/00; B05D 7/24; B05D 1/36; B65D 23/08
[52] U.S. Cl. .......... 428/34.7; 427/314; 427/387; 427/389.7; 427/407.2; 428/34.4; 428/34.6; 428/429
[58] Field of Search .............. 427/407.2, 387, 427/314, 165, 389.7, 384; 428/34.4, 34.7, 34.6, 428, 429

[56] References Cited

U.S. PATENT DOCUMENTS

| | | | |
|---|---|---|---|
| 3,734,765 | 5/1973 | Russell et al. | 427/407.2 |
| 3,873,352 | 3/1975 | Kitaj | 427/387 |
| 3,966,531 | 6/1976 | Bargain | 427/407.2 |
| 4,053,076 | 10/1977 | Vogel et al. | 428/35 |
| 4,130,407 | 12/1978 | Ida | 427/407.2 |
| 4,130,677 | 12/1978 | Huntsberger | 427/407.2 |
| 4,304,802 | 12/1981 | Mosse et al. | 427/386 |
| 4,985,286 | 1/1991 | Kurita et al. | 427/387 |
| 5,104,692 | 4/1992 | Belmares | 427/164 |
| 5,567,235 | 10/1996 | Carson et al. | 106/287.16 |

Primary Examiner—Diana Dudash

[57] ABSTRACT

A process for producing surface-sealed hollow glass containers, wherein as part of the production process the hollow glass containers are coated in the region of the exit from the annealing lehr, which is arranged following a machine for producing hollow glass containers, with a water-based cold end coating composition comprising a silane, where atop this first coat there is subsequently applied a second coat of a water-based cold end coating composition that comprises the following components:

I. a water-based organopolysiloxane-containing composition prepared from alkoxysilanes which carry a functional group and alkoxysilanes which are selected from trialkoxysilanes, dialkoxysilanes and tetraalkoxysilanes, and II. a silicon-free component selected from a wax, a partial fatty acid ester, a fatty acid and/or a surfactant.

The hollow glass containers produced in this way feature an enhanced long-term service strength.

22 Claims, No Drawings

PROCESS FOR MANUFACTURING SURFACE-SEALED HOLLOW GLASS CONTAINERS

The invention relates to a process for producing surface-sealed hollow glass containers with the aid of special cold end coating compositions.

In the preparation process for hollow glass containers it is conventional to subject them to a surface treatment with which it is intended to cover external damage such as microcracks, and to minimize further damage. Thus immediately downstream of the production machine the so-called hot end coating is applied as a thin coat to the surface of the glass which is at from 500 to 550° C. The compounds involved in this hot end coating are, in particular, chlorides of titanium and of tin. On the glass surfaces these compounds produce a titanium or tin dioxide layer, with the chlorine released passing into the waste gas. The hot end coating composition is applied by vaporization or spray atomization.

After hot end coating, the hollow glass containers pass through an annealing lehr in which they are cooled slowly in order to avoid harmful stresses.

At the discharge end of the annealing lehr, the hollow glass containers hot end coated beforehand are cold end coated by means of either vaporization or spray atomization. This produces the lubricity required for the remainder of the process in the glass plant and in the bottling plant.

The most common substances used as cold end coating agents are surfactants, fatty acid products, partial fatty acid esters, ester wax emulsions and various polyethylene dispersions.

A coating process in which hot end coating is carried out first and then a cold end coating composition comprising an olefin polymer, a polyurethane, a polystyrene or an alkylamine acetate is applied by spraying is known from DE-C 12 91 448. The bottles coated in this way, however, do not satisfy all requirements.

A certain degree of improvement in the scratch resistance is obtained if the polyethylene dispersion sprayed on as the cold end coating composition additionally comprises a silane (U.S. Pat. Nos. 3,438,801, 3,801,361, 3,873,352, 4,130,677, 4,374,879; EP-A-0 146 142). However, the level of properties is still not sufficient for all applications.

A further development of the prior art was to apply by spraying, as the cold end coating, first the solution or dispersion of a silane and then a further component such as, for example, a polyethylene dispersion. Reference is made here to U.S. Pat. Nos. 3,438,801, 4,130,677, 4,304,802, 5,567,235 (corresponding to WO-A-95/00259) and to EP-A-0 146 142 and EP-A-0 478 154.

It is known, furthermore, that cold end coating can also be carried out with a polysiloxane (U.S. Pat. No. 4,985,286; DE-A-31 44 457).

The coatings described do indeed ensure a good basic strength of the glass containers; however, this strength falls rapidly in the subsequent production process and in the subsequent use of the containers. Causes of this loss in strength are microscopic damage, which occurs unavoidably during shaping and during the subsequent transportation of the glass containers while being hot and which may act as a potential source of fracture depending on the level and situation of the damage and on the stress experienced by the containers.

One object of the present invention is to render such microscopic damage harmless actually in the course of the production process.

A further object is to render the hollow articles less sensitive to mechanical effects acting on the surface in the course of subsequent handling, i.e. on the conveyor belt and in the course of packaging, dispatch and filling. Another important aspect is that the hollow articles should have an improved durability in long-term use relative to the prior art. Thus, in particular, reusable bottles for carbonated drinks should still have a sufficiently high strength and, in particular, internal pressure resistance even after many returns.

In addition, the hollow glass containers should have improved chemical resistance, especially with respect to water and washing liquors.

It is the intention, furthermore, that the dry and wet scratch resistance should be increased and so the nick scratch properties improved.

Overall, the intention is to improve the mechanical properties relative to the prior art in such a way that it is possible to reduce the weight of the container with no change in strength.

The mechanical properties are also to be improved relative to the prior art such that hot end coating can be omitted with no change in final strength.

It should be possible, relative to the customarily performed coating, to achieve improved labeling, even with conventional glues.

These improvements are intended to be obtained with an extremely simple process which can be carried out on conventional production lines without significant additional investment. The intention in this context is, in particular, to avoid the need for a curing step, since that would imply greater investment and process costs.

Overall, the effect in accordance with the invention should ensue directly after the process measure has been carried out, i.e. without a significant waiting period, so that the protective effect occurs without delay in the course of subsequent further transportation on the belt.

To achieve these objects the invention proposes a process for producing surface-sealed hollow glass containers, where as part of the production process the hollow glass containers in the region of the exit from the annealing lehr, which is arranged following a machine for producing hollow glass containers, are coated with a water-based cold end coating composition comprising a trialkoxysilane, a dialkoxysilane and/or a tetraalkoxysilane and/or the hydrolysis and/or condensation products thereof, which comprises subsequently applying to this first coat a second coat of a water-based cold end coating composition that comprises the following components:

a water-based organopolysiloxane-containing composition prepared from
a) Q moles of functional group-bearing alkoxysilanes of the general formula $$A\text{—}Si(R^1)_y(OR^*)_{3-y} \qquad\qquad I$$

and
b) M moles of alkoxysilanes selected from
α) trialkoxysilanes of the general formula $$R^2\text{—}Si(OR^{**})_3 \qquad\qquad II$$

and/or
β) dialkoxysilanes of the general formula $$R^3R^4Si(OR^{***})_2 \qquad\qquad III$$

and/or

γ) tetraalkoxysilanes of the general formula $$Si(OR^{****})_4 \quad \text{IV,}$$

where A is a substituent possessing at least one amino, alkylamino, dialkylamino, amido, epoxy, acryloxy, methacryloxy, cyano, isocyanato, ureido, thiocyanato, mercapto, sulfane or halogen group which is attached directly or via an aliphatic or aromatic hydrocarbon radical to silicon, $R^1$=methyl, ethyl or A (as defined above),
y=0 or 1,
$R^*$, $R^{}$, $R^{*}$ and $R^{****}$ independently of one another are an alkyl group having 1 to 8 carbon atoms or a corresponding alkyl group that is substituted by an alkyl[(poly)ethylene glycol] radical,
$R^2$, $R^3$ and $R^4$ independently of one another are an alkyl, alkenyl, alkynyl, cycloalkyl, cycloalkenyl or aromatic group having in each case not more than 18 carbon atoms, or a group of this kind which is partially fluorinated, perfluorinated and/or substituted by alkyloxy and/or by aryloxy groups,
in a molar ratio $0 \leq M/Q \leq 20$, and II. a silicon-free component selected from
a) a wax and/or
b) a partial fatty acid ester and/or
c) a fatty acid and/or
d) a surfactant;

and additionally wherein the water-based cold end coating composition applied as second coat has a dry-matter content of from 0.1 to 10% by weight and, based on dry matter, the weight ratio of the organopolysiloxane-containing composition I to the silicon-free component II is from 0.05:1 to 20:1.

The invention also provides, moreover, the hollow glass containers produced by this process.

Hollow glass containers for the purposes of this invention are, in principle, any type of glass packaging, examples being bottles, preserve jars, ampules, tablet tubes or flasks.

In the region of the entrance of the annealing lehr it is possible if desired to apply a conventional hot end coating composition by any technique of the prior art to the surfaces of the freshly produced hollow glass containers. In view, however, of the massive increase in service strength achieved in accordance with the invention it is possible to omit hot end coating, which is not only more cost-effective but also, by reducing the emissions, offers an ecological advantage. Furthermore, if hot end coating is dropped, a further result is improved conditions as a result of additional freedom in the production of glass containers, such as extending the machine belt cooling and the lateral cooling, better access, the possibility of installing hot end inspection machines, etc.

The silane of the first coat that is employed can be any compound which comes under the formulae I to IV below; for example, any of the silanes specified below. It is of course also possible in this context to use mixtures.

This silane or this mixture can be used in aqueous solution (homogeneous or colloidal) or as an emulsion if the latter is stable. The concentration depends on the requirements of the technical application and is therefore subject to no fundamental restrictions. It can, for example, be not more than 20%, not more than 15%, not more than 10%, not more than 7.5%, not more than 5%, not more than 3%, not more than 2%, not more than 1% or not more than 0.8%. The minumum content is, for example, 0.05%, 0.1%, 0.2% or 0.3%. All percentages here and below are percentages by weight.

In one preferred embodiment, these silanes are employed as hydrolysis and/or condensation product, with particular preference as water-based organopolysiloxane-containing composition, as is detailed further below as component I of the second coat.

The water-based cold end coating composition of the first coat can if desired contain up to 10% by weight of organic cosolvents, although this is less preferred. It may additionally, furthermore, comprise a conventional coating composition in a customary amount, examples being a wax, a partial fatty acid ester, a fatty acid, a surfactant, a polyacrylate, an epoxy resin or any desired mixture thereof. Suitable waxes, partial fatty acid esters, fatty acids and surfactants are elucidated more precisely below. Suitable upper limits, based on the dry-matter content, are, for example, 5%, 4%, 3%, 2%, 1%, 0.8%, 0.6%, 0.5%, 0.4% or 0.3%, whereas appropriate lower limits to be mentioned are, for example, 0.01%, 0.03%, 0.05% or 0.1%.

The cold end coating composition of the first coat is applied to the surface of the hollow glass containers in a customary manner, such as by spraying, dipping or rolling, in the course of which the temperature range of the glass surface is from about 30 to 150° C. more preferably from about 50 to 130° C., especially from about 70 to 110° C. and, with particular preference, from 80 to 100° C. The applied coat can subsequently be dried, before the second coat is applied. Drying generally requires from about one to a number of seconds at the process temperature.

In order to obtain very high strength values it is possible, after drying, to subject the first coat additionally to a curing step, for instance by heating at temperatures between 50 and 250°C. preferably between 120 and 220° C. where in the lower temperature range a heating period of several hours may be necessary while in the upper temperature range a heating period of a few seconds is sufficient. In order to simplify the process sequence, however, the process is preferably operated without a curing step.

Atop the first coat there is subsequently applied a second coat which will now be elucidated further in the text below.

The functional group-bearing alkoxysilane of the general formula $$A\text{—}Si(R^1)_y(OR^*)_{3-y} \quad \text{I}$$

can be selected, for example, from the following compounds:

3-aminopropyltrimethoxysilane,
3-aminopropyltriethoxysilane,
3-pyrrolidinopropyltrimethoxysilane, N-methyl-3-aminopropyltrimethoxysilane,
3-aminopropylmethyldiethoxysilane, N-aminoethyl-3-aminopropyltrimethoxysilane, N-(benzylaminoethyl)-3-aminopropyltrimethoxysilane,
p-anilinotriethoxysilane,
4-aminobutylmethyldiethoxysilane, $(CH_3O)_3Si$—$C_3H_6$—$NH$—$C_2H_4$—$NH$—$C_2H_4$—$NH_2$,

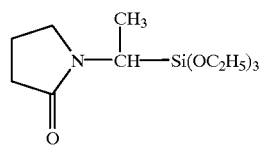

3-glycidymloxypropylyltrimethoxysilane,

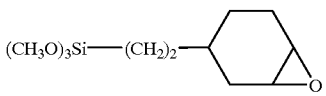

CH$_2$=C(CH$_3$)—COO—C$_3$H$_6$—Si(OCH$_3$)$_3$,
CH$_2$=CH—COO—C$_3$H$_6$—Si(OC$_2$H$_5$)$_3$,
3-cyanopropyltrimethoxysilane,
3-cyanopropyltriethoxysilane,
3-isocyanatopropyltriethoxysilane,
ureidopropyltrimethoxysilane,
3-thiocyanatopropyltrimethoxysilane,
3-mercaptopropyltrimethoxysilane,
3-mercaptopropyltriethoxysilane,
3-mercaptopropylmethyldimethoxysilane,
4-meraptobutyltrimethoxysilane,
6-mercaptohexyltrimethoxysilane,
3-chloropropyltrimethoxysilane and (C$_2$H$_5$O)$_3$Si(CH$_2$)$_3$—S$_4$—(CH$_2$)$_3$Si(OC$_2$H$_5$)$_3$.

Examples of compounds suitable as the trialkoxysilane of the general formula

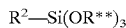     II are the following:
methyltrimethoxysilane, methyltriethoxysilane, ethyltrimethoxysilane, ethyltriethoxysilane, n-propyltriethoxysilane, n-butyltrimethoxysilane, i-butyltrimethoxysilane, octyltriethoxysilane, hexadecyttrimethoxysilane, stearyltrimethoxysilane, cyclohexyltrimethoxysilane, cyclohexenylethyltriethoxysilane, phenyltrimethoxysilane, phenyltriethoxysilane, vinyltrimethoxysilane, vinyltriethoxysilane, vinyltri(2-methoxyethoxy)silane, allyltrimethoxysilane, allyltriethoxysilane, CF$_3$CH$_2$CH$_2$—Si(OCH$_3$)$_3$, CF$_3$CH$_2$CH$_2$—Si(OC$_2$H$_5$)$_3$, C$_2$F$_5$CH$_2$CH$_2$—Si(OCH$_3$)$_3$, C$_4$F$_9$CH$_2$CH$_2$—Si(OCH$_3$)$_3$, n-C$_6$F$_{13}$CH$_2$CH$_2$—Si(OC$_2$H$_5$)$_3$, n-C$_8$F$_{17}$CH$_2$CH$_2$—Si(OCH$_3$)$_3$ and n-C$_{10}$F$_{21}$CH$_2$CH$_2$—Si(OCH$_3$)$_3$.

Suitable dialkoxysilanes of the general formula

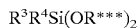     III are, for example, dimethyldimethoxysilane, dimethyldiethoxysilane, diethyidimethoxysilane, methyl-i-butyldiethoxysilane, cyclohexylmethyidimethoxysilane, diphenyidimethoxysilane, diphenyldiethoxysilane, methylphenyidimethoxysilane and CF$_3$CH$_2$CH$_2$Si(CH$_3$)(OCH$_3$)$_2$.

Examples of compounds suitable as the tetraalkoxysilane of the general formula

     IV are the following:
tetramethoxysilane, tetraethoxysilane, tetra(n-propoxy)silane, tetra(i-propoxy)silane and tetra(n-butoxy)silane.

In the mixture of the silanes I to IV there are on average per silicon atom preferably at least 2.4 alkoxy groups OR*, OR, OR* and/or OR****, with particular preference at least 2.5 alkoxy groups and, with very particular preference, at least 2.6 alkoxy groups. This makes it possible to ensure that the resulting organopolysiloxane-containing compositions are sufficiently soluble in water. Depending, however, on the substituents A and R$^1$ to R$^4$ it is also possible for sufficiently water-soluble systems to be obtained even below the preferred minimum value of 2.4. Here, the skilled worker is able to fall back on his or her experience and to discover suitable systems, if appropriate, by means of simple routine experiments.

The water-based organopolysiloxane-containing composition (component I) can be prepared from the monomers of the formulae I to IV by mixing the silane composition with water and leaving it to stand at room temperature for at least 3 hours. In this case at least 0.5 mol and preferably at least 1 mol of water should be used per mole of the alkoxysilanes employed. It is also possible to add from the start the entire amount of water that is present in the ready-to-use cold end coating composition. During the maturation period, initial condensation takes place to give oligomeric structures. In this context it is readily possible to add the silicon-free component II right at the beginning.

In a preferred embodiment, the mixture of the silane composition with water (and, if appropriate, with component II) is left to stand for at least 4 hours and, with particular preference, for at least 6 hours at room temperature (approximately 20° C.).

At higher or lower temperatures it is necessary to adapt the maturation period appropriately. In doing so it is possible to make use of the rule of thumb that an increase in temperature by 10° C. involves roughly a doubling in the rate of reaction.

Alternatively, the water-based organopolysiloxane-containing composition can be prepared by adding from 0.5 to 30 mol of water per mole of the alkoxysilanes employed to the silane composition in accordance with the general formulae I to IV and removing by distillation the alcohol that is formed in the course of the reaction. Suitable processes, and some of the oligomeric structures formed in the reaction, are disclosed in DE-A 44 43 824 and DE-A 44 43 825, which are expressly included herein by reference.

The resulting composition can be homogeneous or colloidal. In accordance with the invention it is also possible to use an emulsion provided it is stable. The sole fundamental prerequisite which must be met is that no precipitations occur during the period of use.

The ratio of the alkoxysilanes of the formulae II to IV to the functional alkoxysilanes of the formula I is preferably $0 \leq M/Q \leq 12$, with particular preference $0.02 \leq M/Q \leq 7$ and, with very particular preference, $0.1 \leq M/Q \leq 4$.

The silicon-free component (component II) acts as a synergist to achieve particularly high strength values.

The wax used as component II is employed in the form of an aqueous dispersion. It is possible here in principle to use any water-dispersible wax.

Natural waxes and synthetic waxes are equally suitable. As natural waxes it is possible to use both recent waxes, such as beeswax, carnauba wax or candelilla wax, and fossil waxes, such as montan wax or its derivatives or petroleum waxes (both paraffin waxes and microwaxes).

Examples of suitable synthetic waxes are Fischer-Tropsch waxes, polyolefin waxes, such as polyethylene wax, polypropylene wax, polyisobutylene wax, and also ester wax (e.g. stearic esters of ethylene glycol, diethylene glycol, polyethylene glycol, 1,4-butanediol, or glycerol tristearate), amide waxes (e.g. N,N'-distearoylethylenediamine), polyethylene glycol wax and polypropylene glycol wax.

Apolar waxes such as petroleum waxes, Fischer-Tropsch waxes and polyolefin waxes can be employed in oxidized form in order to improve their dispersibility. Wax oxidates of this kind have long been prior art.

It is of course also possible to use mixtures of different waxes.

Regarding more precise details reference may be made to Ullmann's Encyclopedia of Industrial Chemistry, Vol. A 28, pp. 103–163, VCH Verlagsgesellschaft, Weinheim, 1996.

Within the framework of the invention it is preferred to employ a polyethylene wax (referred to below as "polyethylene"). The polyethylene used generally has a number-average molecular weight $M_n$ in the range from 400 to 20,000. It is preferred to employ a polyethylene having an $M_n$ in the range from 500 to 15,000 and is particularly preferred to employ one having an $M_n$ in the range from 1000 to 8000. The polyethylene can be prepared by thermal and, if desired, free-radical degradation of polyethylene of higher molecular weight or else by polymerization of ethylene, either free-radically or by means of a transition metal catalyst.

The polyethylene may to a certain extent feature instances of branching, which in the case of short-chain branching as well may have been induced by the concomitant use of olefinic comonomers such as propene, 1-butene or 1-hexene.

In order to prepare a dispersion suitable for cold end coating it is common to start from partially oxidized polyethylene which may in addition have been esterified and/or saponified. A large number of such polyethylenes are obtainable commercially.

Another possibility is to employ copolymers composed of more than 50 mol-% of ethylene and less than 50 mol-% of a polar monomer, examples being ethylene-vinyl acetate copolymer waxes or copolymers of ethylene and acrylic acid.

Another possibility for preparing dispersible polyethylene is to graft polyethylene in the melt with an unsaturated polar monomer such as maleic anhydride. In this case it is generally sensible to add a free-radical initiator.

From the polyethylene thus modified it is possible by customary methods, with or without further modification, to prepare a nonionic, anionic or cationic dispersion surfactants normally being added as emulsifiers.

The partial fatty acid ester used as component II can be of any type which is customarily employed for cold end coating. Examples that may be mentioned are glycerol monoacetate, glycerol monostearate, glycerol distearate and mixed partial esters of mannitol with stearic acid and palmitic acid.

Suitable fatty acids used as component II have the structure R—COOH where R is a radical of 10 to 22 carbon atoms and can be straight-chain or branched, saturated or unsaturated. Examples that may be mentioned are oleic acid, stearic acid, palmitic acid and lauric acid.

Surfactants suitable as component II can be anionic, cationic or nonionic. Examples of anionic surfactants used are alkali metal salts or ammonium salts of fatty acids which contain at least about 10 carbon atoms and can be saturated or unsaturated. Particularly suitable ammonium salts in this context are morpholinium salts and also mono-, di- or triethanolammonium salts. Owing to the acceptability under foodstuffs law, the good biodegradability and the good performance properties, potassium oleate is used in particular. Examples of other suitable anionic surfactants are alkali metal salts of the sulfate esters of $C_8$ to $C_{10}$ fatty alcohols, or alkali metal salts of the sulfonic acids of aliphatic $C_{12}$ to $C_{20}$ hydrocarbons.

As cationic surfactants it is possible, for example, to employ compounds of the type $(RNH_3)^+CH_3COO^-$ or $(RNH_3)^+Cl^-$ where R is a hydrocarbon radical of 8 to 20 carbon atoms. Examples of other suitable ammonium salts are acetates or chlorides of $[RN(CH_3)_3]^+$ or $[R_2N(CH_3)_2]^+$, where R is likewise a $C_8$- to $C_{20}$-alkyl or aralkyl radical.

Examples of nonionic surfactants are polyoxyethylene glycerol fatty acid esters, alkylphenol ethoxylates having 5 to 30, especially 6 to 12 ethylene oxide groups, for example octylphenoxy-polyethoxyethanol, esterification products of fatty acids containing 7 to 22 carbon atoms with polyethylene glycol, for example of stearic acid or oleic acid with PEG40, adducts of ethylene oxide and $C_8$ to $C_{20}$ alcohols, or adducts of ethylene oxide with $C_8$-to $C_{20}$-alkylamines.

It is also possible in principle to use any other surfactant not set out hereinabove. Restrictions consist only insofar as the surfactant should be as unobjectionable as possible from the physiological standpoint and should be to some extent biodegradable.

Of course, component II can also be a mixture of different substances, such as of wax and surfactant, wax, fatty acid and surfactant, partial fatty acid ester and fatty acid, or any other desired combination.

The coating composition used in accordance with the invention is a dilute aqueous system having a dry-matter content of preferably 0.1–8% by weight, more preferably 0.1–6% by weight, with particular preference 0.2–5% by weight and, in particular, 0.5–3% by weight. The aqueous system can if desired contain up to 10% by weight of organic cosolvents, although this is less preferred. The weight ratio of the dry matter of the organopolysiloxane-containing composition (component I) to the silicon-free component II here is from 0.05:1 to 20:1, preferably from 0.05:1 to 5:1 and, with particular preference, from 0.1:1 to 2:1.

It is additionally preferred for the organopolysiloxane-containing composition to be present as dry matter in the ready-to-use coating composition in a proportion of not more than 5% by weight, more preferably not more than 3% by weight, very preferably from 0.03 to 2% by weight, with particular preference from 0.05 to 1% by weight and, with very particular preference, from 0.1 to less than 1% by weight. For the purposes of normal use, concentrations of not more than 0.8% by weight of component I are usually entirely sufficient.

The dry-matter content of the water-based, polysiloxane-containing composition is defined as that solid fraction which remains after storage of a defined amount (approximately 1 g) in a single-use boat for 1 h at 125° C. in a drying cabinet. After the end of the drying operation, for gravimetric analysis the single-use boat is cooled to room temperature in a desiccator for 20 minutes and is back-weighed to a precision of 1 mg on an analytical balance.

The aqueous composition which comprises components I and II can be prepared either in ready-to-use concentration directly or else first as a concentrate which is then diluted with water prior to being used.

The coat of the cold end coating composition is applied to the surfaces of the hollow glass containers in a customary manner, such as by spraying, dipping or rolling. The cold end coating composition is applied in the temperature range of the glass surfaces of from about 30 to 150° C. preferably from about 70 to 110° C. and, with particular preference, from 80 to 100° C.

The treated hollow glass containers are protected against mechanical damage immediately after treatment, so that they can be directly transported further without suffering through impact or the pressure of jostling.

The advantages achieved with the process of the invention are associated directly with the morphology of the two coats. With the aid of analytical methods it is possible, beyond the coat thickness, to define a distribution profile of the different elements (i.e. Si, C, O and, if present, N) which is typical for the process. The hollow glass containers obtained in accordance with the invention therefore differ structurally in this respect from the hollow glass containers of the prior art.

The intention in the text below is to illustrate the invention by way on examples,

EXAMPLE 1

This example illustrates the treatment of hot end coated ($TiCl_4$) 0.5 ltr NRW beer bottles with a strength-enhancing solution of silane and water and the subsequent application of a silane-modified polyethylene dispersion in order to obtain the lubricity required for bottle handling in the production plant and at the bottle-filling premises.

a) Solution used for the 1st coat:

1580 g of water (87.8 mol) are charged to a heatable stirred reactor (internal thermometer, metering apparatus via dip tube, distillation apparatus, connection to vacuum pump) and 540 g of 3-aminopropyltriethoxysilane (2.4 mol) are meter ed in slowly such that the temperature does not exceed 50° C. This reaction is slightly exothermic. The apparatus is then thermostated at 50° C. and stirring is continued for 6 hours. After this time, the silane has undergone complete hydrolysis to the corresponding silanol and has dissolved in the resulting $EtOH/H_2O$ mixture. The hydrolysis alcohol is subsequently distilled off under a pressure of 100–70 mbar and a bottom temperature of max. 50° C.

When the overhead temperature is about 48° C. and the top product contains only $H_2O$, distillation is ended and the product is adjusted to a weight of 1980 g by adding $H_2O$.

5 parts by weight of this solution are mixed with 95 parts by weight of water. This mixture can then be used directly.

b) Mixture used for the 2nd coat:

2.0 parts by weight of a polyethylene dispersion bearing the commercial designation TECOL OG 25 from Trüb Chemie, Ramsen, Switzerland (solids content 25%; anionic emulsifier system) are admixed with 97.5 parts by weight of water. Then 0.5 part by weight of 3-aminopropyltriethoxysilane is incorporated by mixing, after which the mixture is allowed to stand at room temperature for 6 hours. The mixture is then ready for use.

c) For comparison:

Standard cold end coating in accordance with the prior art using a mixture of 2.0 parts by weight of TECOL OG 25 from Trüb Chemie, Ramsen, Switzerland and 98.0 parts by weight of water.

The application of the strength-enhancing silane solution is made at a bottle temperature of about 80° C. the subsequent application of the silane-modified polyethylene dispersion at about 50° C. Coating takes place with the aid of a modified spraying technique. For the series of experiments, the internal pressure resistances of one mold batch were measured at the exit from the annealing lehr after 1 minute and after 5 minutes of the line simulator and were compared with the internal pressure resistances of bottles with the standard coating and bottles with a silane-modified polyethylene dispersion. Table 1 shows the measured internal pressure resistances with associated standard deviations, while FIG. 1 presents the results as a frequency distribution. This graphic representation makes it clear that not only an increase in the internal pressure resistance but also a regularization of the individual values, with a narrow frequency distribution, is obtained. Outliers toward low strengths are very largely avoided.

TABLE 1

|  | HV/KV | HV/SPL | HV/SL/SPL |
|---|---|---|---|
| Annealing lehr |  |  |  |
| Mean [bar] | 47.55 | 51.39 | 50.81 |
| Standard deviation [bar] | 10.14 | 8.60 | 7.72 |
| 1 min line simulator |  |  |  |
| Mean [bar] | 25.10 | 27.67 | 28.51 |
| Standard deviation [bar] | 2.92 | 2.74 | 3.52 |
| 5 min line simulator |  |  |  |
| Mean [bar] | 21.66 | 25.22 | 22.68 |
| Standard deviation [bar] | 2.25 | 2.42 | 1.79 |

HV: Hot end coating ($TiCl_4$)
KV: Cold end coating with the mixture from c)
SL: Silane-based solution from a)
SPL: Silane-modified polyethylene dispersion from b)

EXAMPLE 2

This example illustrates the treatment of hot end coated ($TiCl_4$) 0.5 ltr single-trip beer bottles with a strength-enhancing solution of silane and water and the subsequent application of a silane-modified polyethylene dispersion to obtain the lubricity required for the handling of the bottles in the production plant and at the bottle-filling premises.

a) Solution used for the 1st coat:

5.0 parts by weight of 3-aminopropyltriethoxysilane and 95.0 parts of water are mixed and then the mixture is left to stand at room temperature for 6 hours. The mixture is then ready for use.

b) Mixture used for the 2nd coat:

Similar to Example 1 b), but with 1.5 parts by weight of TECOL OG 25, 98 parts by weight of water and 0.5 part by weight of 3-aminopropyltriethoxysilane.

c) For comparison:

Standard cold end coating similar to Example 1 c), but with 1.5 parts by weight of TECOL OG 25 in 98.5 parts by weight of water.

The application of the strength-enhancing silane solution is made at a bottle temperature of about 83° C. the subsequent application of the silane-modified polyethylene dispersion at about 60° C. Coating takes place with the aid of a modified spraying technique. For the series of experiments, the internal pressure resistances of one mold batch were measured at the exit from the annealing lehr after 1 minute, after 5 minutes and after 10 minutes of the line simulator and were compared with the internal pressure resistances of bottles with the standard coating. Table 2 shows the measured internal pressure resistances with associated standard deviations.

TABLE 2

|  | HV/KV | HV/SL/SPL |
|---|---|---|
| Annealing lehr |  |  |
| Mean[bar] | 41.66 | 44.87 |
| Standard deviation [bar] | 9.14 | 7.19 |
| 1 min line simulator |  |  |
| Mean [bar] | 15.82 | 31.15 |
| Standard deviation [bar] | 2.50 | 6.58 |

TABLE 2-continued

|  | HV/KV | HV/SL/SPL |
|---|---|---|
| 5 min line simulator | | |
| Mean [bar] | 12.47 | 23.64 |
| Standard deviation [bar] | 1.69 | 3.95 |
| 10 min line simulator | | |
| Mean [bar] | 13.05 | 17.94 |
| Standard deviation [bar] | 1.42 | 2.66 |

HV: Hot end coating ($TiCl_4$)
KV: Cold end coating with the mixture from c)
SL: Silane-based solution from a)
SPL: Silane-modified polyethylene dispersion from b)

EXAMPLE 3

The following recipe leads to an organopolysiloxane-containing composition which is suitable for the preparation of a cold end coating composition for the first coat and/or for the second coat.

86.4 g of water are metered over the course of 10 minutes into an initial charge comprising a mixture of 265.2 g of 3-aminopropyltriethoxysilane (1.2 mol), 88.8 g of propylmethyldimethoxysilane (0.6 mol) and 98.4 g of propyltrimethoxysilane (0.6 mol). In the course of this addition the temperature rises from 25° C. to 50° C. The reaction mixture is stirred at 60° C. for 2 hours; then 136 g of the resulting hydrolysis alcohol are distilled off at 250 mbar and 45° C. Subsequently, a mixture of 274 g of water and 72.3 g of 84% strength by weight aqueous formic acid is metered in over the course of 15 minutes; in the course of this addition the temperature rises from 45° C. to 550° C. Then an ethanol/methanol/water mixture is distilled off over the course of about 4 hours (200–133 mbar; 50° C.) and at the same time is replaced by water so that the concentration of the solution remains constant. When the overhead temperature is about 50° C. and the top product contains only water, the distillation is ended; the product is then adjusted with water to a weight of 2262 g.

With this composition, the same good results as in Examples 1 and 2 are obtained.

EXAMPLE 4

With the following recipe as well an organopolysiloxane-containing composition is obtained which is suitable for the preparation of a cold end coating composition for the first coat and/or for the second coat, the same good results being obtained as in the previous examples.

304.3 g of 3-aminopropyltriethoxysilane (1.376 mol) are charged together with 101.1 g of methyltriethoxysilane (0.568 mol) to a heatable stirred reactor (internal thermometer, metering apparatus via dip tube, distillation apparatus, connection to vacuum pump). Then 608.5 g of $H_2O$ (33.8 mol) are metered in, the first 50 g very slowly (exothermic hydrolysis), such that a temperature of 50–55° C. is attained. At the end of the hydrolysis reaction the temperature falls; by adjusting the heating the temperature should be thermostated at 55° C. again as quickly as possible. Stirring is continued for 2 hours and then the EtOH formed is distilled off under a vacuum of 135 mbar. The bottom temperature during this distillation should not exceed 75° C. After taking off about 50 g of distillate, the mixture is supplemented with 50 g of $H_2O$. At a take-off of 100 g, a sample of the distillate is taken and is analyzed by GC. The amount of $H_2O$ to be added is determined from the GC distribution of $H_2O$ and EtOH and from the volume taken off. After each further taking of 100 g of distillate a sample is taken for analysis, the missing volume is supplemented with $H_2O$, and the amount of EtOH removed by distillation is calculated. The end of the distillation at a bottom temperature of 75° C. is also the end of the reaction [amounts taken off: about 265 g of EtOH (5.8 mol) and about 95 g of $H_2O$ (5.3 mol); $H_2O$ required for supplementing: about 350 g (19.4 mol)]. The bottom product which remains is adjusted by further addition of $H_2O$ to the mass originally present prior to distillation.

EXAMPLE 5

With the following recipe as well an organopolysiloxane-containing composition is obtained which is suitable for the preparation of a cold end coating composition for the first coat and/or for the second coat, the same good results being obtained as in the previous examples.

708 g of 3-glycidyloxypropyltrimethoxysilane (3.0 mol) are charged to a heatable stirred reactor (internal thermometer, metering apparatus via dip tube, distillation apparatus, connection to vacuum pump). 162 g of $H_2O$ (9.0 mol; 3.0 mol/mol of 3-glycidyloxypropyltrimethoxysilane) and 3.5 g of HCOOH (85% strength) are mixed and the mixture is added over the course of 20 minutes. During this time the temperature rises from 20° C. to 35° C. The reaction mixture is stirred at 60° C. for 2 hours. Then the hydrolysis alcohol is distilled off under a pressure of 300–133 mbar and at a bottom temperature of 40–50° C. and is replaced by $H_2O$ [about 500 g (27.8 mol)]. When the overhead temperature is about 50° C. and the top product contains only $H_2O$, distillation is ended and the product is adjusted with $H_2O$ [about 825 g (45.8 mol)] to a weight of 1770 g.

Frequency distribution of an NRW beer bottle
(basis strength at the annealing lehr)

Frequency of breakage
Internal pressure resistance [bar]
FIG. 1

What is claimed is:
1. A process for producing surface-sealed hollow glass containers, where as part of the production process the hollow glass containers in the region of the exit from the annealing lehr, which is arranged following a machine for producing hollow glass containers, are coated with a water-based cold end coating composition comprising a trialkoxysilane, a dialkoxysilane and/or a tetraalkoxysilane and/or the hydrolysis and/or condensation products thereof, which comprises subsequently applying to this first coat a second coat of a water-based cold end coating composition that comprises the following components:
I. a water-based organopolysiloxane-containing composition prepared from
a) Q moles of functional group-bearing alkoxysilanes of the general formula $$A\text{—}Si(R^1)_y(OR^*)_{3-y}$$

and
b) M moles of alkoxysilanes selected from
α) trialkoxysilanes of the general formula $$R^2\text{—}Si(OR^{**})_3 \qquad\qquad II$$

and/or

β) dialkoxysilanes of the general formula $$R^3R^4Si(OR^{***})_2 \qquad III$$

and/or

γ) tetraalkoxysilanes of the general formula $$Si(OR^{****})_4 \qquad IV,$$

where A is a substituent possessing at least one amino, alkylamino, dialkylamino, amido, epoxy, acryloxy, methacryloxy, cyano, isocyanato, ureido, thiocyanato, mercapto, sulfane or halogen group which is attached directly or via an aliphatic or aromatic hydrocarbon radical to silicon, $R^1$=methyl, ethyl or A (as defined above), $y=0$ or 1, $R^*$, $R^{}$, $R^{*}$ and $R^{****}$ independently of one another are an alkyl group having 1 to 8 carbon atoms or a corresponding alkyl group that is substituted by an alkyl((poly)ethylene glycol) radical, $R^2$, $R^3$ and $R^4$ independently of one another are an alkyl, alkenyl, alkynyl, cycloalkyl, cycloalkenyl or aromatic group having in each case not more than 18 carbon atoms, or a group of this kind which is partially fluorinated, perfluorinated and/or substituted by alkoxy and/or by aryloxy groups, in a molar ratio $0 \leq M/Q \leq 20$, and II. a silicon-free component selected from
   a) a wax and/or
   b) a partial fatty acid ester and/or
   c) a fatty acid and/or
   d) a surfactant;
   and additionally wherein the water-based cold end coating composition of the second coat has a dry-matter content of from 0.1 to 10% by weight and, based on dry matter, the weight ratio of the organopolysiloxane-containing composition (component I) to the silicon-free component II is from 0.05:1 to 20:1, wherein in the mixture of the silanes I to IV there are on average per silicon atom at least 2.4 alkoxy groups $OR^*$, $OR^{}$, $OR^{*}$ and/or $OR^{****}$.

2. The process as claimed in claim 1, wherein the water-based organopolysiloxane-containing composition is prepared by mixing the silane composition in accordance with the general formulae I to IV with water and leaving the mixture to stand at room temperature for at least 3 hours.

3. The process as claimed in claim 1, wherein the water-based organopolysiloxane-containing composition is prepared by adding from 0.5 to 30 mol of water per mole of the alkoxysilanes employed to the silane composition in accordance with the general formulae I to IV and removing by distillation the alcohol that is formed in the course of the reaction.

4. The process as claimed in claim 1, wherein the ratio of the alkoxysilanes of the formulae II to IV to the functional alkoxysilanes of the formula I is $0 \leq M/Q \leq 12$.

5. The process as claimed in claim 1, wherein the ratio of the alkoxysilanes of the formulae II to IV to the functional alkoxysilanes of the formula I is $0.02 \leq M/Q \leq 7$.

6. The process as claimed in claim 1, wherein the ratio of the alkoxysilanes of the formulae II to IV to the functional alkoxysilanes of the formula I is $0.1 \leq M/Q \leq 4$.

7. The process as claimed in claim 1, wherein prior to application of said first coat, the surfaces of freshly produced hollow glass containers have been provided with a hot end coating.

8. The process as claimed in claim 1, wherein the wax is employed in the form of an aqueous dispersion.

9. The process as claimed in claim 1, wherein the coating compositions used contain up to 10% by weight of organic cosolvents.

10. The process as claimed in claim 1, wherein the coating composition used for the second coat is an aqueous system having a dry-matter content of from 0.1 to 8% by weight.

11. The process as claimed in claim 10, wherein the dry-matter content is from 0.2 to 5% by weight.

12. The process as claimed in claim 10, wherein the dry-matter content is from 0.5 to 3% by weight.

13. The process as claimed in claim 1, wherein, based on dry matter, the weight ratio of the organopolysiloxane-containing composition I to the silicon-free component II is from 005:1 to 5:1.

14. The process as claimed in claim 13, wherein the weight ratio is from 0.1:1 to 2:1.

15. The process as claimed in claim 1, wherein the content of the organopolysiloxanecontaining composition in the coating composition used for the second coat is not more than 5% by weight.

16. The process as claimed in claim 15, wherein the content of the organopolysiloxane-containing composition in the coating composition is from 0.03 to 2% by weight.

17. The process as claimed in claim 16, wherein the content of the organopolysiloxane-containing composition in the coating composition is from 0.05 to 1% by weight.

18. The process as claimed in claim 17, wherein the content of the organopolysiloxane-containing composition in the coating composition is from 0.1 to less than 1% by weight.

19. The process as claimed in claim 1, wherein the temperature of the glass surface when the cold end coating compositions are applied is in the range from 30 to 150° C.

20. The process as claimed in claim 19, wherein the temperature of the glass surface is in the range from 70 to 110° C.

21. The process as claimed in claim 1, wherein the cold end coating composition used for the first coat also comprises a water-based organopolysiloxane-containing composition prepared from a) Q moles of functional group-bearing alkoxysilanes of the general formula $$A\text{---}Si(R^1)_y(OR^*)_{3-y}$$

and b) M moles of alkoxysilanes selected from
   α) trialkoxysilanes of the general formula $$R^2\text{---}Si(OR^{**})_3 \qquad II$$

and/or
   β) dialkoxysilanes of the general formula $$R^3R^4Si(OR^{***})_2 \qquad III$$

and/or
   γ) tetraalkoxysilanes of the general formula $$Si(OR^{****})_4 \qquad IV,$$

where A is a substituent possessing at least one amino, alkylamino, dialkylamino, amido, epoxy, acryloxy, methacryloxy, cyano, isocyanato, ureido, thiocyanato, mercapto, sulfane or halogen group which is attached directly or via an aliphatic or aromatic hydrocarbon radical to silicon, $R^1$=methyl, ethyl or A (as defined above), y=0 or 1, $R^*$, $R^{}$, $R^{*}$ and $R^{****}$ independently of one another are an alkyl group having 1 to 8 carbon atoms or a corresponding alkyl group that is substituted by an alkyl((poly)ethylene glycol) radical, $R^2$, $R^3$ and $R^4$ independently of one another are an alkyl, alkenyl, alkynyl, cycloalkyl, cycloalkenyl or aromatic group having in each case not more than 18 carbon atoms, or a group of this kind which is partially fluorinated, perfluorinated and/or substituted by alkoxy and/or by aryloxy groups, in a molar ratio $0 \leqq M/Q \leqq 20$.

22. A hollow glass container produced as claimed in claim 1.

* * * * *